United States Patent [19]
Paradine et al.

[11] Patent Number: 6,049,565
[45] Date of Patent: Apr. 11, 2000

[54] METHOD AND APPARATUS FOR AUDIO COMMUNICATION

[75] Inventors: Christopher Paradine, Southampton; Philip James Russell, Alresford, both of United Kingdom

[73] Assignee: International Business Machines Corporation, Armonk, N.Y.

[21] Appl. No.: 08/682,551

[22] PCT Filed: Jun. 19, 1995

[86] PCT No.: PCT/GB95/01422

§ 371 Date: Jan. 13, 1997

§ 102(e) Date: Jan. 13, 1997

[87] PCT Pub. No.: WO96/19061

PCT Pub. Date: Jun. 20, 1996

[30] Foreign Application Priority Data

Dec. 16, 1994 [GB] United Kingdom .................. 9425428

[51] Int. Cl.⁷ .................................................. H04B 1/10
[52] U.S. Cl. .......................................... 375/217; 375/351
[58] Field of Search .................................. 375/242, 240, 375/351, 222, 354, 216, 217; 455/218, 212; 328/109

[56] References Cited

U.S. PATENT DOCUMENTS

| | | | |
|---|---|---|---|
| 4,423,416 | 12/1983 | Bailey et al. | 375/217 |
| 4,577,310 | 3/1986 | Korsky et al. | 370/359 |
| 4,663,765 | 5/1987 | Sutphin et al. | 375/351 |
| 5,091,906 | 2/1992 | Reed et al. | 370/278 |
| 5,109,526 | 4/1992 | Reed | 455/11.1 |
| 5,295,156 | 3/1994 | Heep et al. | 375/222 |
| 5,519,640 | 5/1996 | Ganesan et al. | 395/200.66 |

FOREIGN PATENT DOCUMENTS

| | | |
|---|---|---|
| 53-49432 | 2/1979 | Japan . |
| 57-132542 | 2/1984 | Japan . |
| 63-77189 | 10/1989 | Japan . |
| 63-295576 | 5/1990 | Japan . |
| 64-233666 | 4/1991 | Japan . |
| 2-52226 | 11/1991 | Japan . |
| 2-188109 | 3/1992 | Japan . |
| 2-283055 | 5/1992 | Japan . |

OTHER PUBLICATIONS

"SBP.—Net: An Integrated Voice/data Token Ring LAN," Bolis et al., Computer Communications, vol. 16, No. 8, Aug. 1993, pp. 494–500.

"Design of an Integrated Services Lan Architecture," Ahuja et al., AICC '91, vol. 2, Jun. 1991, pp. 830–835.

"Optimized Data Time Stamps for Digital Audio & Video on a Stocha STIC N/WRK," IBM TDB vol. 36, No. 9A, Sep. 1993, p. 183.

*Primary Examiner*—Tesfaldet Bocure
*Attorney, Agent, or Firm*—John D. Flynn; Winstead, Sechrest & Minnick

[57] ABSTRACT

Audio communication apparatus which facilitates reduction of data network traffic. The communication apparatus distinguishes between voice activity and silence or background noise. Upon termination of voice activity the apparatus output the contents of it memory thus far for transmission over the data network. When voice activity is resumed after a period of inactivity, the transmission of voice data is resumed and an indication of the elapsed time between the previous voice samples and the current samples is also transmitted to a receiving terminal to allow correct timing of the output of the resumed transmission of the voice samples.

10 Claims, 4 Drawing Sheets

METHOD AND APPARATUS FOR AUDIO COMMUNICATION

BACKGROUND OF THE INVENTION

1. Field of the Invention

The present invention relates to a method and apparatus for audio communication over a data network.

Conventionally voice signals have been transmitted over standard telephone lines. However, with the increase in locations provided with local area networks (LANS) and the growing importance of multimedia communications, there has been considerable interest in the use of LANs to carry voice signals. This work is described for example in "Using Local Area Networks for Carrying Online Voice" by D Cohen, pages 13–21 and "Voice Transmission over an Ethernet Backbone" by P Ravasio, R Marcogliese, and R Novarese, pages 39–65, both in "Local Computer Networks" (edited by P Ravasio, G Hopkins, and N Naffah; North Holland, 1982). The basic principles of such a scheme are that a first terminal or workstation digitally samples a voice input signal at a regular rate (e.g. 8 Khz). A number of samples are then assembled into a data packet for transmission over the network to a second terminal, which then feeds the samples to a loudspeaker or equivalent device for playout, again at a constant 8 Khz rate.

2. Description of the Prior Art

Conventional older audio communication systems comprise a central mixing hub and audio conferencing terminals connected thereto in a star network. The central hub receives audio signals from each terminal and produces a composite signal therefrom. The composite signal is then transmitted back to each terminal less that terminal's own audio signal. This is to be contrasted against LAN audio conferencing systems which have a more distributed architecture. Each terminal must receive via a data network the audio signals of all of the other terminals connected to the data network. Receiving the audio signals in parallel requires a large amount of bandwidth.

The bandwidth requirement of an audio communication system using a scheme as described above varies according to the number of users of the system. For example, in an audio communication system which encodes audio as 8 bit pulse code modulation sampled at 8 Khz: a two way audio conference requires a bandwidth of 2×64 kbps; a five way audio conference using individual addressing requires a bandwidth of 20×64 Kbps; and a five way audio conference using group addressing requires a bandwidth of 5×64 Kbps.

Consequently, it can be seen that the greater the number of parties to a conference, the greater the bandwidth required to implement the audio communication system. Allowing an audio communication system to utilise the available bandwidth of a LAN without restraint will have an adverse effect on the overall performance of the LAN.

In a typical two-party conversation, each party speaks for approximately less than forty percent of the total time for which the parties are connected (see "The Voice Activity Detector for Pan-European Digital Cellular Mobile Telephone Service", by Freeman et al, IEEE 1989). The audio communication apparatus used by each party conventionally picks up acoustic waves in the vicinity of a microphone associated therewith. The acoustic waves include the voice of a party to the conversation and any background office noise. An electrical signal representing acoustic waves is produced by the microphone. The signal is digitised to produce digital audio samples of the output of the microphone. The samples are then placed in, for example, packets and transmitted over the local area network to a receiving apparatus for output to the other party to the communication. As only forty percent of the samples produced by one of the parties contain voice data, it follows that only forty percent of the traffic attributable to the two-way conversation comprises voice data, the remaining packets produced end transmitted contain silence or, in an office environment, very low level background noise. GB 2 172 475 A discloses a packet switching system in which speech is packetised and voice activity detectors are used to monitor speech in the Go and Return paths. In the Go path, the voice activity detector compares the current level of packets with (a) the current back-ground noise value, and (b) the computed value of the expected echo due to speech packets in the Return path. If the Go path packet is larger than the parameter of (a) and (b) by a preset arrangement the packet is sent, otherwise it is not. If the "send" decision persists for a number of speech packets, that send condition has a hangover period attached to it. If the parameters are properly chosen, then the speech heard by a subscriber is not duly affected.

A further problem with using a LAN to carry voice data is that the transmission time across the network is variable. Thus the arrival of packets at a destination node is both delayed and irregular. If the packets were played out in irregular fashion, this would have an extremely adverse effect on intelligibility of the voice signal.

SUMMARY OF THE INVENTION

Accordingly, the present invention provides a method for audio communication comprising receiving a plurality of digital audio samples in a memory and transmitting said digital audio samples over a data network when a predetermined number thereof have been accumulated, said method further comprising the steps of detecting that a current sample does not represent voice activity, transmitting all samples stored in said memory over said data network irrespective of whether or not there are said predetermined number thereof, and suspending transmission of said samples; detecting that a current sample represents a resumption of voice activity, resuming said transmitting of said samples, and transmitting an indication of the duration of said suspension.

As a consequence of suspending further transmission of samples over the data network, redundant packets containing, in effect, silence or background office noise, are obviated and the traffic load of the data network is significantly reduced. Accordingly, a very efficient way of reducing the traffic load over a data network is provided. Reducing the traffic load of a data network improves the performance and efficiency of use thereof. Both transmitting and receiving apparatuses are free to process other data rather than concern themselves with processing voice samples which constitute silence or mere background noise.

Although the efficiency of utilisation of a data network can be improved as a consequence of using data compression algorithms, such algorithms are not appropriate to compress silence. The compression of silence introduces noise to the audio communication and, more significantly, still contributes to the traffic load of the network. Accordingly, the present invention by suspending further transmission of audio data upon detecting silence advantageously reduces data network traffic as compared to audio communication apparatuses which use audio compression techniques.

Such an indication or time stamp advantageously allows a receiving apparatus terminal to correctly time the output of the received samples after a period of silence or non-transmission from the transmitting apparatus thereby mitigating the effect of delays introduced as a consequence of data network latency.

A suitable time stamp or indication could be a sample count. Each count represents a single period having a duration determined by the sampling rate.

An extended period of inactivity over a data network typically results in the network timing-out and dropping the connection between the apparatuses.

Accordingly, the present invention provides a method comprising periodically transmitting over said data network during said suspension a message in order to prevent said data network from timing-out.

The time-out data can be used to maintain the correct timing of the output of data at a receiving terminal. Therefore, the present invention further provides a method wherein said time-out data comprises said a sample count.

If a count of samples representing non-voice activity were transmitted to a receiving terminal every time the DSP had counted sufficient samples which, had they been stored, could fill the memory, the extent of traffic load reduction achieved would be mitigated.

Suitably, an aspect of the present invention provides a method wherein said periodic transmission is effected a predetermined integer multiple of said sample count thereby minimising the load on the data network.

Having received the voice samples and timing information it is desirable to produce an audio output therefrom.

Accordingly, the present invention provides a method for audio communication comprising receiving a number of digital audio samples over a data network and producing an audio output therefrom, said method further comprising the steps of receiving further audio samples after a suspension in transmission of said audio samples, receiving an indication of the duration of the suspension in transmission of said audio samples, and resuming said production of said audio output according to said indication.

The present invention also provides an apparatus for audio communication comprising means for receiving a plurality of digital audio samples in a memory and means for transmitting said digital audio samples over a data network when a predetermined number thereof have been accumulated, said system further comprising means for detecting that a current sample does not represent voice activity, means for transmitting all samples stored in said memory over said data network irrespective of whether or not there are said predetermined number thereof, and means for suspending transmission of said samples; means for detecting that a current sample represents a resumption of voice activity, means for resuming said transmitting of said samples, and means for transmitting an indication of the duration of said suspension.

BRIEF DESCRIPTION OF THE DRAWINGS

An embodiment of the present invention will now be described, by way of example only, with reference to the accompanying drawings in which.

DETAILED DESCRIPTION OF THE INVENTION

Figure 1:
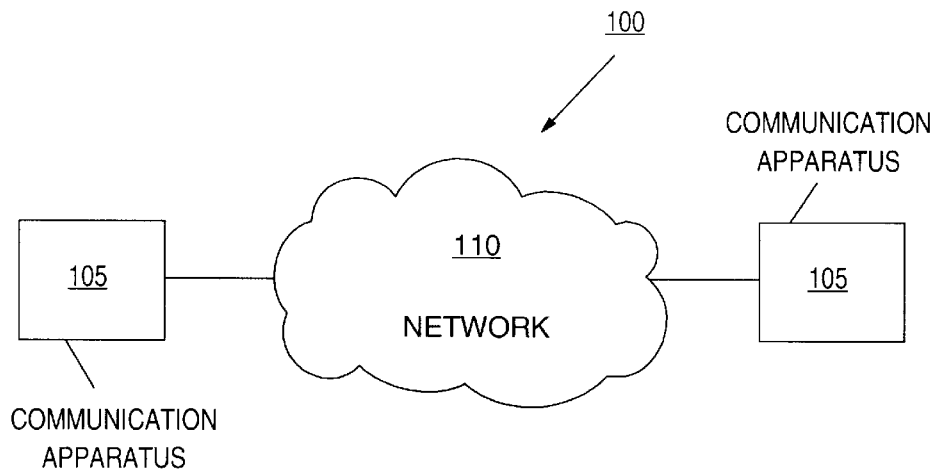
FIG. 1 is a schematic diagram of an audio communication system.

Referring to FIG. 1, there is shown an audio communication system 100 in which audio communication apparatuses 105 exchange voice data over a data network 110.

Figure 2:
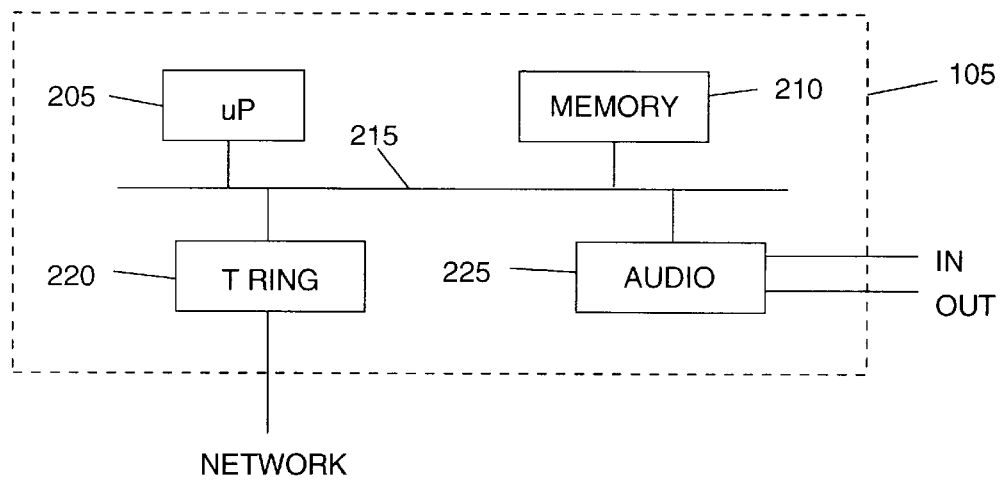
FIG. 2 is a block diagram of apparatus for audio communication according to an embodiment.

FIG. 2 is a schematic illustration of an audio communication apparatus 105. The apparatus 105 comprises a microprocessor 205, semiconductor memory (ROM/RAM) 210, and a bus 215 over which data is transferred. The apparatus 105 may be implemented using any conventional workstation, such as an IBM PS/2 computer.

The apparatus 105 is also equipped with two adapter cards. The first of these is a Token Ring adapter card 220. This card 220, together with accompanying software, allows messages to be transmitted to and received from a Token Ring operating over a local area or data network 110. The operation of the token ring card is well-known, and so will not be described in detail.

The second card is an audio adapter card 225. The audio adapter card is connectable to a microphone and a loudspeaker (not shown in FIG. 2) for audio input and output respectively. The apparatuses are typically used for N-way voice communications over a LAN, where N is at least two, but may also be used in other multimedia applications, where one node in the network, for example, generates a sound signal (e.g. from an optical disk), which is transmitted over the network to be played out to a user at another node.

Figure 3:
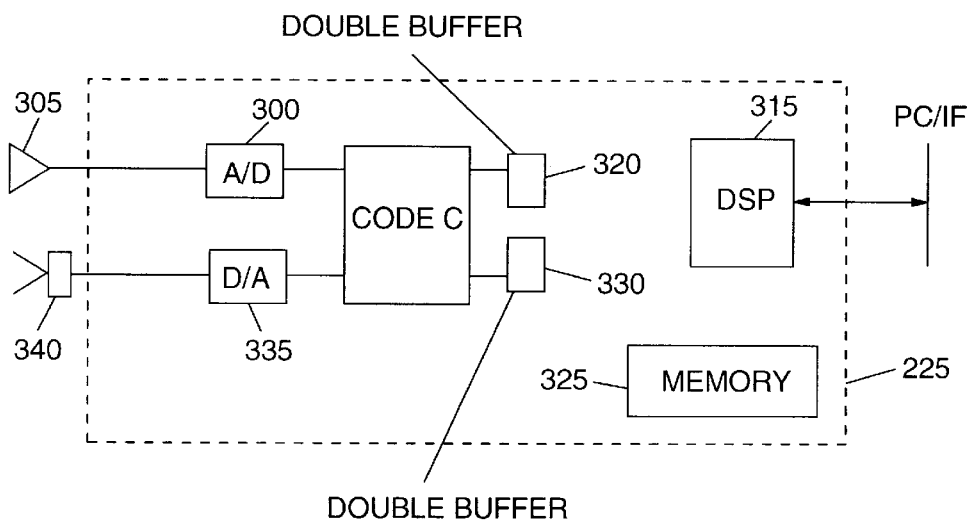
FIG. 3 is a simplified diagram showing the components of an audio adapter card, FIG. 4 schematically illustrates the arrangement of samples and other data within memory.
Figures 4, 5:
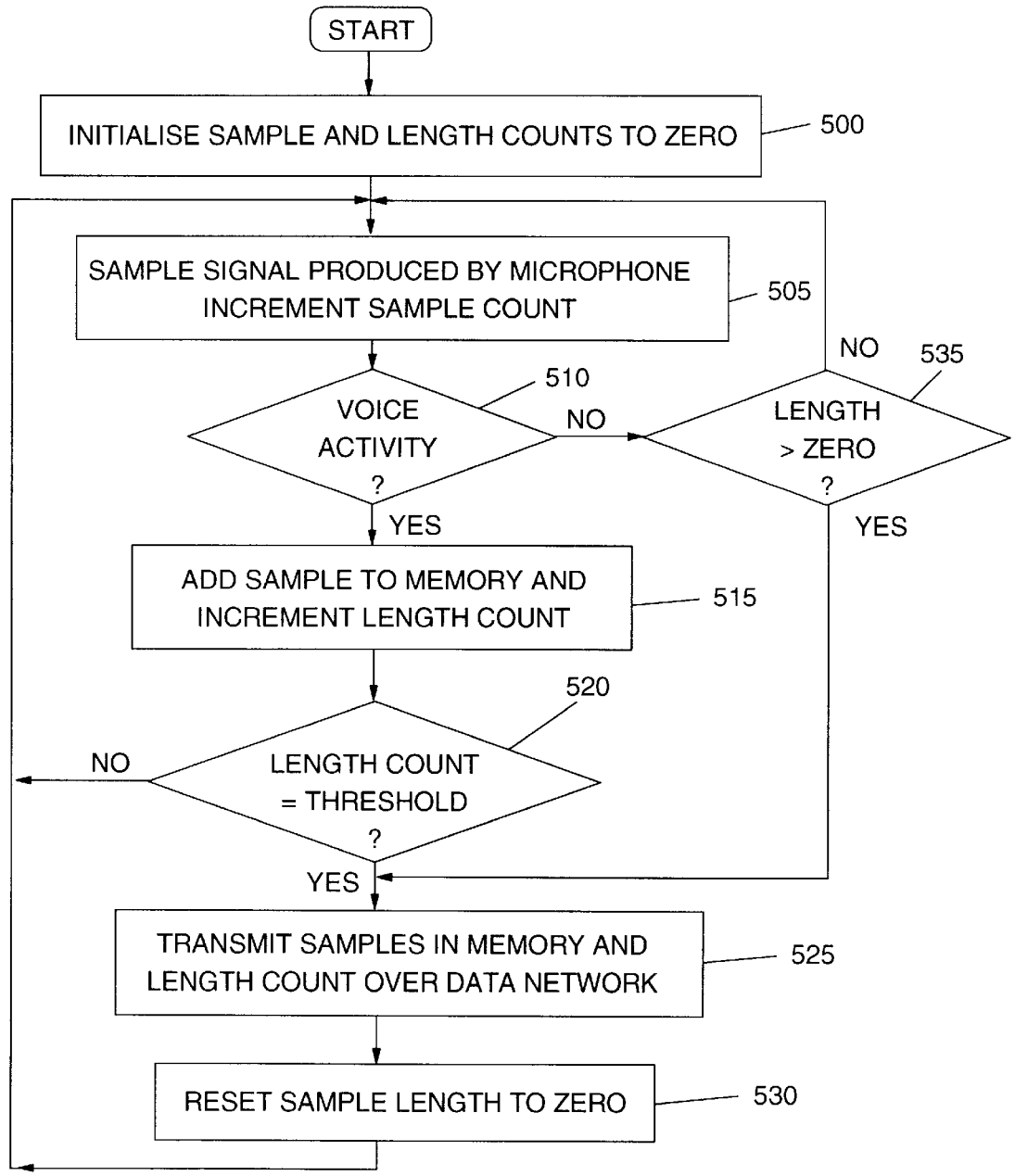
FIG. 5 is a flow diagram representing the operation of the apparatus for audio communication of FIG. 2.

The audio adapter card 225 is illustrated in more detail in FIG. 3. The audio adapter card 225 schematically illustrated is an M-Wave card available from IBM. The card contains an A/D converter 300 to digitise incoming audio signals derived from an attached microphone 305. The A/D converter 300 is attached to a codec 310, which samples the incoming audio signal at a rate of 44.1 Khz into 16 bit samples (corresponding to the standard sampling rate/size for compact disks). Digitised samples are then passed to a digital signal processor (DSP) 315 on the card via a double buffer 320 (i.e., the codec 310 loads a sample into one half of the double buffer while the codec 310 reads the previous sample from the other half). The DSP 315 is controlled by one or more programs stored in semiconductor memory 325 on the card. The DSP places the samples into memory 325 for subsequent transmission thereof to the intended addressee. Referring to FIG. 4, the memory comprises three fields. The first field 400 contains an indication of the number of samples within the memory 325 i.e. a length count. The length count is increased by one for each sample stored in the current block of samples. After transmission of each block of voice samples the length count is reset to zero. The second field 405 contains a sample count representing the total number of samples encountered i.e. both voice and noise samples. The second field 405 typically comprises two bytes and accordingly will overflow to zero after 65536 samples have been counted. The third field 410 contains the voice samples of the current block stored in memory 325. When the samples are ready for transmission the DSP 315 ensures that the contents of memory 325 are transmitted via the token ring card 220 over the network 110 to a receiving terminal 105. That is, the samples 410 together with the length 400 and sample 405 counts are transmitted to the receiving terminal 105.

The length of the memory exceeds that illustrated in FIG. 4. The length field 415 represents the beginning of the next set of samples to be transmitted. Therefore, a further field 415 can optionally be transmitted over the network 110 to delimit the current samples 410 from any succeeding samples.

Although the embodiment described comprises a memory 325 having three fields, an embodiment can equally well be realised in which the two counts are stored in separate registers which are, for example, internal to the DSP. The counts 400 and 405 can then be added to the samples 410 to be transmitted during the transfer of the samples 410 to the token ring card 220.

The samples 410 may be output for transmission upon the occurrence of any of the following events. The number of samples in memory 325 reaches a predetermined maximum number (such a limit is necessary to prevent the speech samples from being unduly delayed and thereby affecting the intelligibility of speech), silence or suspension of voice activity is detected, or, during prolonged periods of silence, a maximum predetermined period of silence or period of suspension is reached.

The communication links between the DSP 315 and the microprocessor 205 of both a transmitting and receiving apparatuses, the respective token ring cards of a transmitting 105 and receiving 105 apparatuses all comprises asynchronous links. Accordingly, in the embodiment described, the capture of samples at the transmitting terminal and output of the samples at the receiving terminal are asynchronous processes.

In the particular embodiment shown, the DSP is programmed to transform samples from the codec from 16 bits at 44.1 Khz into a new digital signal having an 8 Khz sampling rate, with 8-bit samples on a $\mu$-law scale (essentially logarithmic), i.e., corresponding to CCITT standard G.711, using standard re-sampling techniques. The total bandwidth of the signal is therefore 64 Khz. The DSP also performs the opposite conversion on an incoming signal received, i.e., it converts the signal from 8-bit 8 kHz to 16-bit, 44.1 Khz, again using known re-sampling techniques.

Note that this conversion between the two sampling formats is not an essential part of the invention. Some other audio cards may intrinsically support the 8 Khz format (i.e., the CODEC can operate according to G.711 format), or, alternatively, the 44.1 Khz samples could be used throughout. The latter option demands a much higher bandwidth and greatly increased processing speed: these might be acceptable if the audio signal being transmitted over the network needs to be of CD quality, but for normal voice communications the 64 Khz bandwidth signal of the G.711 format is perfectly adequate.

The DSP aggregates 64 samples in the G711 format together into blocks of 64 bytes, corresponding to 8 ms of data. This represents the basic unit of processing and transmission over the network. Thus every 8 ms, a new block of samples is available for transmission over the data network. Finally, the DSP raises an interrupt in a thread running on the main processor 205, again in accordance with known interrupt processing techniques, informing it that another block of samples are ready for transmission over the network. The DSP cycles through the loop shown in FIG. 5 every 8 ms.

The main processor 205 requests access to the data network 110 via the Token Ring card 220. This is performed using the NCB_SEND command in the NETBIOS interface (data transmission over a LAN is well-known, and so will not be described in detail; see IBM Local Area Network Technical Reference, SC30-3383-03 for more information). The Token Ring card incorporates the samples into a suitable data packet and transmits it over the network.

The DSP also monitors the samples to determine whether or not they represent voice activity at the microphone 305. Many algorithms are available which can detect voice activity. Such algorithms are disclosed in, for example, U.S. Pat. No. 4,975,657; U.S. Pat. No. 4,700,392; and U.S. Pat. No. 4,028,496. Accordingly, detailed description of such an algorithm will not be given. An appropriate algorithm used to determine whether or not voice activity is present is that used in the cellular communication recommendation Global System for Mobile Telecommunication (GSM) standard. Alternatively, a simple threshold value can be used to determine whether or not samples represent speech i.e. if the sample value is above the threshold voice activity is present and visa versa. If the current sample does not represent voice activity, an interrupt to the microprocessor 205 is raised indicating that the voice samples stored thus far should be immediately transmitted over the data network 110 to the intended addressee. Such an immediate transfer of the samples results in a variable length block of voice samples.

The DSP 215, upon determining that voice activity is not present, no longer stores samples, which now represent either silence or very low level back-ground office noise. Since the samples do not represent voice activity the DSP ceases to interrupt the microprocessor and transmission of data over the data network 110 is suspended. Accordingly, the traffic over the data network 110 is reduced. As only approximately forty percent of the data emanating from a conventional terminal represents voice activity, the present invention achieves approximately a sixty-percent reduction in traffic associated with an audio communication.

During the period of suspension, the DSP continues to monitor the samples output by the codec. The storage and subsequent transmission of samples over the data network is resumed when voice activity is detected.

Although, transmission over the data network is suspended the DSP 215 continues to maintain the sample count. In an embodiment, an overflow count is maintained of the number of times the samples count as overflowed and reset to zero. When the overflow count reaches a predetermined value, an interrupt is raised to the microprocessor 205 requesting transmission of the sample count over the data network. Such a transmission is effected in the usual manner. Periodically transmitting the sample count as described has a two fold advantage. Firstly, the transmission prevents the data network from timing out and dropping the connection between an addressor and an addressee. Secondly, the receiving apparatus can use the sample count to maintain the correct timing of the output of any subsequently received samples representing voice activity when transmission resumes. Transmission continues after resumption as described above.

Referring to FIG. 5, there is shown a flow diagram illustrating the operation of an embodiment. The sample and length counts are set to zero at step 500. At step 505 the signal output from the microphone is sampled and the sample count is incremented by one. A determination is made as to whether or not a microphone is picking up voice activity at step 510. If the microphone is picking up voice activity, the sample is added to the memory 325 and the length count is incremented by one at step 515. After the sample is added to memory 325, a check is made, at step 520, as to whether or not the samples should be output for transmission over the data network by comparing the length count against a predeterminable threshold. The threshold value is dependent upon the maximum size of the buffer or an acceptable transmission delay which will not affect the intelligibility of the speech as discussed above. If there are sufficient samples, all samples stored in the memory 325 are output to the token ring card for transmission over the data network at step 525. At step 530 the length count is reset to zero then sampling of the microphone signal is resumed at step 505. If the microphone is not picking up voice activity, a determination is made at step 535 as to whether or not the memory 325 contains any samples to be output for transmission by the token ring over the data network. If the length count is equal to zero the memory 325 does not contain any such samples and sampling of the microphone signal is resumed. If the length count is not equal to zero, the memory 325 contains samples which should be immediately output for transmission over the network. Any such samples are so output for transmission at step 525. The length count is then reset to zero at step 530 and sampling of the microphone is resumed at step 505.

Although the above uses a count to indicate whether or not the memory contains samples for transmission, a simple flag can equally well be used instead.

Audio signals to be played out are received by the DSP 315 from the terminal bus 315, and processed in a converse fashion to incoming audio. That is, the output audio signals are passed through the DSP 215 and a double buffer 330 to the codec 310, from there to a D/A converter 335, and finally to a loudspeaker 340 or other appropriate output device.

Although the above embodiment uses an interrupt technique to inform the main processor when the next set of samples are available for transmission, a polling technique can equally well be used. The use of a polling technique is preferably when working the present invention within a Windows™ environment. The microprocessor 205 of the terminal 100 periodically interrogates the audio communication apparatus to determine whether or not the current block of voice samples are ready for transmission. The count, stored in memory 325, is used to indicate whether or not the samples are ready for transmission. The DSP maintains an internal count within an internal register and the count stored in memory 225 is maintained at zero until the samples are ready for transmission. Accordingly, upon interrogation by the microprocessor 205, a count of zero indicates that the current block of samples is not ready for transmission where as a non-zero count indicates that the current block of samples is ready for transmission. As above, the samples are ready for transmission if either the maximum number of samples have been stored or suspension of voice activity is detected. Upon the occurrence of either event the DSP copies the internal count into memory 325. Accordingly, when the microprocessor 105 next interrogates the external count in memory 325 other than zero will be seen indicating that the current block of samples are ready to be transmitted via the token ring over the data network to the intended addressee.

Figure 6:
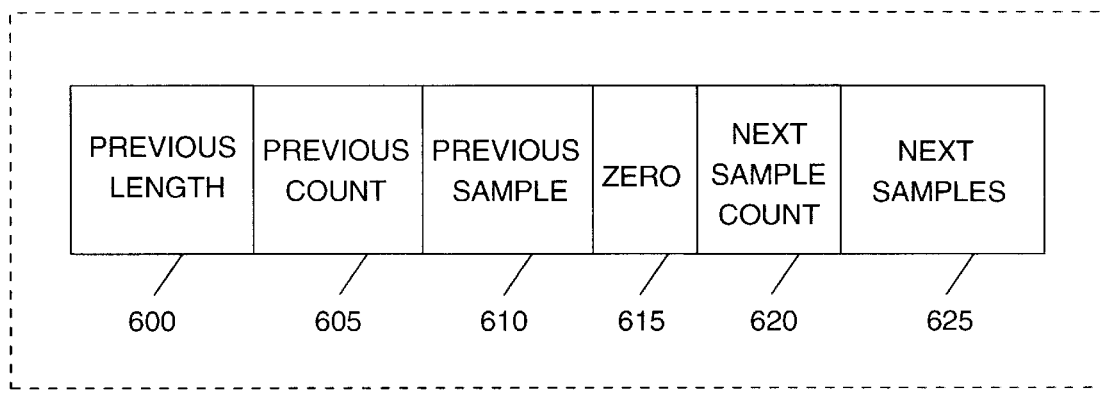
FIG. 6 schematically shows the format of data stored in memory.

The receiving apparatus upon receiving an audio packet over the data network performs the inverse of the above. The microprocessor 205 is informed by the token ring card of the arrival of a message or packet containing samples. The samples together with the sample count are transferred by the microprocessor into memory 325 contiguous with any preceding samples which have yet to be output as shown in FIG. 6. In order to distinguish the most recently received samples 625 and associated counts 615 and 620 from the previously received samples 610 and associated counts 600 and 605, the length count 615 of the former is temporarily withheld (set to zero) by the microprocessor 205. Accordingly, the data loaded into memory by the microprocessor is as shown in FIG. 6. The DSP 315 is arranged to cease output of samples when the zero length count is encountered. Such an arrangement prevents the M-wave card from outputting samples from the next block of samples. Alternatively, the DSP can count or keep track of the number of samples output thus far and by comparing this number against the length count determine when to cease output of samples.

The samples received are output at a rate determined by a local clock at the receiving apparatus. Although, the frequency of the local clock may closely match the frequency of the local clock in the transmitting apparatus, in practice the two clocks do not operate at identical frequencies. Accordingly, over time the corresponding periods of said clocks will occur at different absolute times. It is desirable to maintain the relative timing of speech output.

The DSP 315 of receiving terminal also maintains a sample count. The sample count, as samples are not received during periods of suspended transmission, is incremented according to the local clock at the receiving terminal. Due to the above clock drift, the sample count at the receiving terminal will not necessarily match the samples count at the transmitting terminal. Assuming that the local clock at the receiving terminal is slightly slower than the local clock at the receiving terminal, the sample count at the receiving terminal will be less than that received.

In the embodiment described, the microprocessor cannot interrupt the DSP to indicate that voice samples are ready to be output. Accordingly, the DSP 315, when awaiting samples for output, continually polls the length field in memory to determine whether or not it is zero. When the length field is non-zero, the DSP compares it's sample count with the sample count in the second field of memory and outputs nothing or comfort noise until the two counts match. When the two counts match the samples following the length count are output to the intended addressee thereby ensuring that the relative periods of silence are of the correct length. Further, re-synchronisation is established after the period of silence.

A further embodiment provides for latency compensation at the receiving apparatus in order to absorb transient delays introduced by the data network. The microprocessor 205 of the receiving apparatus upon receiving any samples and associated counts, adds to the sample count representing an actual latency, L. This has the effect of delaying the output of the samples by a time given by L multiplied by the local clock period. The value of L is incrementally increased if underruns occur and gradually decreased while underruns do not occur. Accordingly, the effect of any latency introduced by the data network is mitigated.

A further embodiment can be realised which takes advantage of the adaptive latency compensation in which L is varied only by very small amounts. The receiving apparatus establishes a second count, T, target latency at the beginning of an audio communication and a value for the actual latency, L. The target latency is arranged to decrement by one count every multiple of a predetermined number of received samples. Typically, the target latency may decrease by one count every one thousand received samples. The actual latency value is arranged to slowly track the target latency value. Typically the actual latency value is incremented or decremented by 1 every one thousand received samples. When an underrun occurs the target latency is increased by a predetermined number of samples. The increase in target latency is generally of the order of one to two hundred samples. The target latency then continues slowly decrementing. Accordingly, the target latency varies as a saw-tooth waveform. However, the mean target latency may vary considerably over a long period of time if the respective local clocks drift. The target latency will also increase as a consequence of data network traffic load thereby reducing the occurrence of underruns by incorporating a longer latency. The target latency will of course drift down again when network traffic load is reduced. The actual latency arranged to follow the target latency using very small variations in value as above. Such an arrangement results in the desired adaptive behaviour without introducing any audio clicks that may occur if L were varied using large changes.

Further, in an audio communication comprising more than two participants, each receiving apparatus must maintain for each transmitting apparatus logically connected thereto respective values of L and T as respective local clocks vary independently.

A further embodiment can be realised as follows. The transmitting apparatus transfers audio samples from a microphone attached thereto to a speaker of a receiving apparatus. It is important to reducing the load on the net and the two host microprocessors 205. The speech output must be correctly timed even though the clocks at the apparatuses may drift, and samples may be delayed or lost by the network link.

Figure 7:
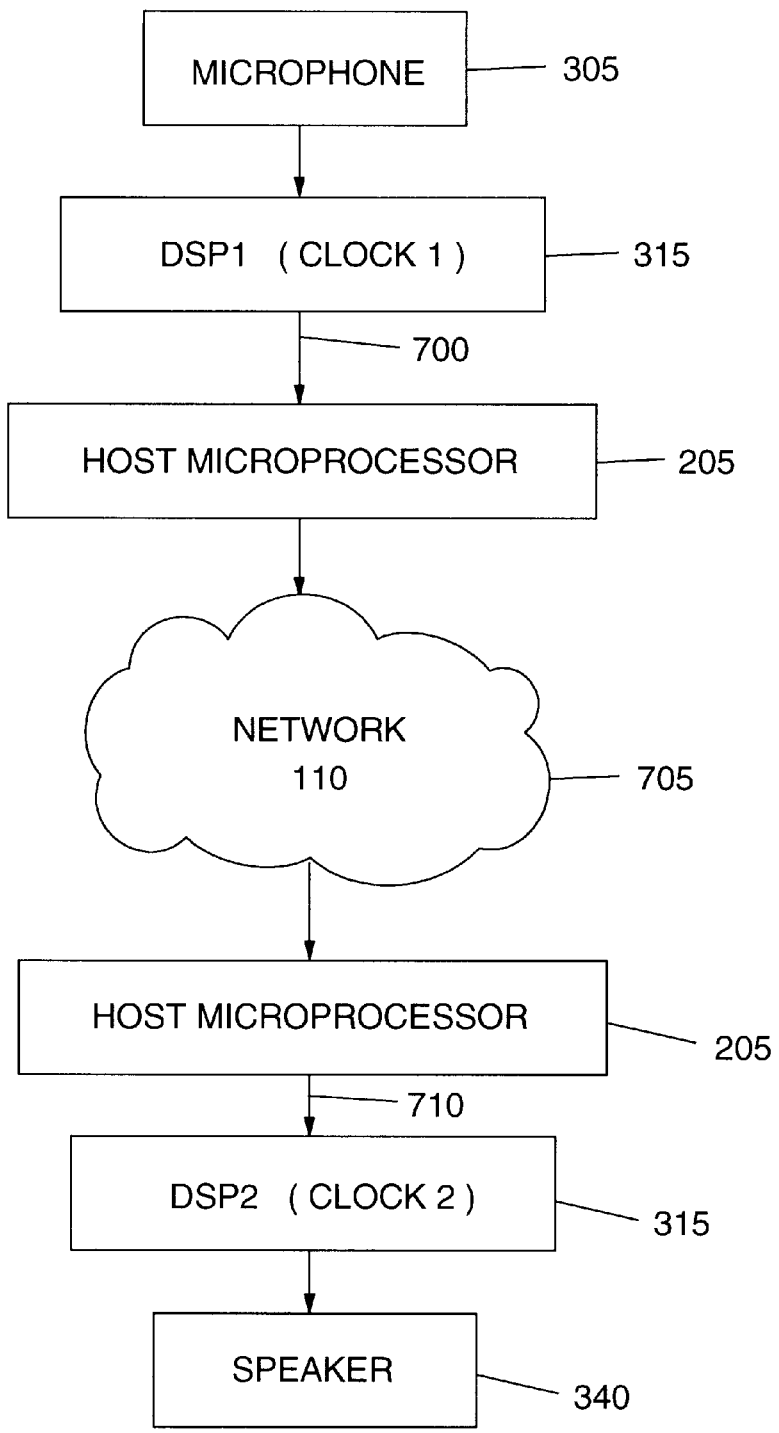
FIG. 7 schematically illustrates the data flow of audio samples through an audio communication system.

Referring to FIG. 7, there is shown schematically the data flow of voice samples through an audio communication system using an embodiment of the present invention. The links 700 and 710 between the DSPs and the microprocessors are asynchronous. Similarly, the link 705 across the network 110 is also asynchronous. Conventionally, double-buffering is used to communicate between a host microprocessor and a DSP card, i.e. one process works on buffer1 while the other process works on buffer2. However, the embodiment described does not use this technique as it may lead to unsatisfactory results where the data is interspersed with periods of non-transmitted silence. Instead the two processes work on a single buffer in memory 325, but control their interaction as follows:

1) DSP1 starts using the buffer by preparing an area of memory equal to its maximum blocksize plus a header which contains a length field and a sample count. The length field is set to zero while work is in progress on the buffer.

2) DSP1 collects speech samples, distinguishing between speech and silence. It copies non-silent samples into the appropriate section of the buffer.

3) DSP1 transfers voice samples across the network when either:
  a) The number of voice samples reaches max block size.
  b) There is a change from speech to silence.
  c) The physical buffer in memory becomes full.
  d) There is a period of silence which exceeds a predetermined duration.

4) The DSP1 indicates that a block is ready for transfer by:
  a) Filling in the sample count. This sample count is the local count of speech samples including silence, so that the receiving apparatus will be able to compute how much silence has been not been transmitted.
  b) Filling in a zero length to the following (unstarted) block.
  c) Finally setting the length count. The non-zero value acts as a signal to free this section of the physical buffer, while the following zero has locked a new section of the buffer for DSP1 to use.

5) The normal action is for DSP1 to interrupt host microprocessor at this point. Then the host will know to use the section of buffer just completed. The above technique has the advantage that it is alternatively possible for the host to periodically poll the buffer to see whether or not the length count contains a non-zero value. This may be more attractive in systems where a program running in an interrupt is in some way restricted.

6) The microprocessor of the transmitting terminal transfers the variable data to the token ring card for transmission across the network. The microprocessor signals to the DSP1 that it has finished using the section of buffer by setting the length back to zero, or alternatively by negating the length to indicate when the block is free for reuse. This is necessary because otherwise DSP1 might continue processing the contents of memory and inadvertently wrap round in the buffer and reuses the memory before the host has read the data.

Note that in the interrupt-driven case the only load put on the microprocessor of the transmitting apparatus (and on the network) is when there is a block of non-silent data to transmit.

However a very long period of silence might cause problems. For example the network link might time out, or the sample count field carried with the data might overflow and reset to zero. The DSP1 sends a null block when the maximum silence limit is reached. This ensures that the DSP of the receiving apparatus will correct any overflow of the sample count. The overhead incurred is normally very small since the packet containing the sample count is correspondingly small.

9) When DSP2 finds a non-zero length field it has data to play, but if its own clock count is still less than the sample count associated with the data either silence is output or output is suspended until the local sample count matches the transmitted sample count. This process that ensures that arbitrary sections of silence are given their correct duration.

10) If its local sample count is already greater than the transmitted sample count, then an underrun has occurred, i.e. the transmitting apparatus is late. DSP2 must detect this although it can do nothing about it other than inform the host microprocessor of its occurrence (lost packets are similarly irretrievable, though the sample count ensures that subsequent packets are still output at the correct time, i.e. a lost packet appears as a suspension in transmission).

11) The local clocks in the respective transmitting and receiving apparatuses may drift with respect to each other. If clock2 is faster than clock1 then underruns occur. If clock2 is slower than clock1 then it output of the samples becomes progressively later and later until the perceived delay becomes intolerable to the human user.

To overcome this the receiving host inserts a deliberate latency delay of L samples. Such a delay is the normal technique to allow the apparatus to absorb transient delays over the network. The receiving apparatus adds L to each sample count field before passing the data to DSP2. L is arranged to vary by very small amounts. L will be incrementally increased if underruns occur and will be gradually decreased while there are no underruns. One major advantage of the process described here is that latency compensation does not need to be on any 'block' basis but the granularity can be as fine as a single sample. A sample is simply discarded to reduce latency, or the last sample is repeated to increase it.

To take advantage of this fine granularity L should not be changed violently. Instead a second count T, the target latency, is introduced. T and L are initialised when the session is established by interrogating the local DSP's count. Thereafter T is reduced continuously (but only slowly, e.g. by one or two samples per thousand) while no underruns occur. When an underrun is detected then T is increased by a relatively large delta, e.g. 100–200 samples, from where it drifts down again. So T varies like a saw-tooth waveform although its mean value may drift up or down by a large amount over a long period, if the clocks drift. It will also drift up in response to transient network load, thereby reducing underruns by incorporating a longer latency, but will drift back down when the load is reduced.

L hunts after T at all times but only by small deltas (1 or two samples per thousand). This ensures that L will give the desired adaptive behaviour, but without any of the audio clicks that may occur if a large (e.g. 20 milliseconds) unit of speech is lost, or a similar segment of silence inserted.

Note that where communication is between many participants it is necessary for each receiving node to maintain independent latency counts, T and L, for each of the sending nodes with which it is connected, since all clocks may drift independently.

Although the an embodiment uses adaptive buffering as described above other methods of adaptive buffering, such as that disclosed in "Adapter Audio Playout Algorithm for Shared Packet Networks", by B Aldred, R Bowater, and S Woodman, IBM Technical Disclosure Bulletin, p255–257, Vol. 36, No.4, April 1993, can equally well be used.

We claim:

1. A method for audio communication comprising the steps of:
   receiving a plurality of digital audio samples in a memory,
   transmitting said digital audio samples when a predetermined number thereof have been accumulated,
   detecting that a current sample does not represent voice activity, transmitting all samples stored in said memory irrespective of whether or not there are said predetermined number thereof, and
   suspending transmission of said samples;
   detecting that a current sample represents a resumption of voice activity, resuming said transmitting of said samples, and
   transmitting an indication of the duration of said suspension.

2. A method as claimed in claim 1, further comprising the step of
   maintaining a count of the number of samples, and
   wherein said indication represents said count.

3. A method as claimed in claim 2, further comprising the step of:
   periodically transmitting, during said suspension a message in order to prevent timing-out.

4. A method as claimed in claim 3, wherein said message comprises an indication of the time of occurrence of said transmission.

5. A method as claimed in claim 4, wherein said indication comprises a sample count representing the number of samples taken.

6. A method as claimed in either of claims 4 or 5, wherein said indication comprises a length count representing the number of samples transmitted.

7. A method for audio communication comprising the steps of:
   receiving a number of digital audio samples and producing an audio output therefrom,
   receiving further audio samples after a suspension in transmission of said audio samples,
   receiving an indication of the duration of the suspension in transmission of said audio samples, and
   resuming said production of said audio output according to said indication, wherein said suspension is in response to a current sample that does not represent audio information.

8. A method for audio communication comprising the steps of:
   receiving a number of digital audio samples and producing an audio output therefrom,
   receiving further audio samples after a suspension of transmission of said audio samples,
   receiving an indication of the duration of the suspension in transmission of said audio samples, and
   resuming said production of said audio output according to said indication, wherein the step of producing comprises compensating for transient network load and clock drift.

9. A method as claimed in claim 8, wherein said compensating comprises the step of modifying said indication.

10. A system for audio communication comprising:
    means for receiving a plurality of digital audio samples in a memory,
    means for transmitting said digital audio samples over a data network when a predetermined number thereof have been accumulated,
    means for detecting that a current sample does not represent voice activity,
    means for transmitting all samples stored in said memory over said data network irrespective of whether or not there are said predetermined number thereof, and
    means for suspending transmission of said samples;
    means for detecting that a current sample represents a resumption of voice activity,
    means for resuming said transmitting of said samples, and
    means for transmitting an indication of the duration of said suspension.

* * * * *